(12) United States Patent
Takano

(10) Patent No.: US 6,541,935 B2
(45) Date of Patent: Apr. 1, 2003

(54) METHOD FOR CONTROLLING STEPPING MOTOR

(75) Inventor: Koji Takano, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/154,159

(22) Filed: May 23, 2002

(65) Prior Publication Data

US 2002/0175650 A1 Nov. 28, 2002

(30) Foreign Application Priority Data

May 28, 2001 (JP) ..................................... 2001-158820

(51) Int. Cl.[7] .............................................. G05B 19/40
(52) U.S. Cl. .................... 318/685; 318/561; 360/73.01; 360/75; 360/69
(58) Field of Search ............................... 318/685, 561; 360/73.01, 75, 69

(56) References Cited

U.S. PATENT DOCUMENTS

| 4,775,903 A | * | 10/1988 | Knowles .................. 360/78.07 |
| 4,931,889 A | * | 6/1990 | Osafune ................... 360/78.07 |
| 4,937,689 A | * | 6/1990 | Seaver et al. ............. 360/78.07 |
| 4,965,501 A | * | 10/1990 | Hashimoto ................... 318/595 |
| 4,980,876 A | * | 12/1990 | Abate et al. ............. 369/44.11 |
| 4,988,933 A | * | 1/1991 | Ogawa ........................ 318/561 |

* cited by examiner

Primary Examiner—Rita Leykin
(74) Attorney, Agent, or Firm—Fish & Richardson P.C.

(57) ABSTRACT

A method for controlling a stepping motor that moves an object from an initial position by a target distance. The method includes calculating a moved distance of the object, calculating a remaining moving distance of the object, updating a first velocity value until the moved distance exceeds a first reference value, updating a first position value indicating the present position of the accelerated object by adding the updated first velocity value to the first position value, updating a second velocity value when the remaining distance is less than the second reference value by subtracting a second acceleration value from the second velocity value, and updating a second position value indicating the present position of the decelerated object by adding the updated second velocity value to the second position value.

12 Claims, 5 Drawing Sheets

METHOD FOR CONTROLLING STEPPING MOTOR

BACKGROUND OF THE INVENTION

The present invention relates to a method for controlling a stepping motor, and more particularly, to a method for controlling a tracking servo of a stepping motor used in a disc reproduction apparatus.

A digital audio compact disc (CD) may be used as a read-only memory (CD-ROM) for various types of computer-readable digital data. A disc reproduction apparatus that reproduces such a CD has a servo mechanism to control the relative position between the disc and a pickup so that the pickup can correctly trace a spiral recording track on the disc.

FIG. 1 is a schematic block diagram of a disc reproduction apparatus 100. A spiral recording track is formed on at least one side of the disc 1. Digital data, which complies with a predetermined format, is recorded along the recording track. For example, in a CD, pits having a predetermined length are formed on the recording track in accordance with an EFM signal, which is obtained by performing eight to fourteen modulation (EFM) on digital data. The spindle motor 2 rotates the disc 1 at a predetermined speed in accordance with a drive signal SD, which is provided from a servo control circuit 7.

A pickup 3, which is mounted on a sled 4, includes a laser beam source and a sensor. In a state in which the sled 4 is attached to a drive device (not shown) and the pickup 3 is opposed to the recording track surface of the disc 1, the pickup 3 is moved in the radial direction of the disc 1. An actuator 5 moves the sled 4 in the radial direction of the disc 1 in accordance with a drive signal TD provided from a servo control circuit 7.

A signal processing circuit 6 receives an output signal read from the disc 1 by the pickup 3 and performs operations such as waveform shaping and binary coding to generate the EFM signal. The EFM signal is shifted between two levels in accordance with the pits and lands formed on the recording track of the disc 1. Based on the output signal of the pickup 3, the signal processing circuit 6 generates a tracking error signal TE and an off track signal OT. More specifically, the pickup 3 includes a main beam source, which reads the data recorded on the disc 1, and an auxiliary beam source, which reads the position of the main beam source relative to the recording track of the disc 1. The signal processing circuit 6 generates the EFM signal from the read output signal of the main beam source and generates the tracking error signal TE from the read output signal of the auxiliary beam source. The tracking error signal TE is normally maintained at "0" level when the reading position of the pickup 3 relative to the disc 1 is correct. When the pickup 3 moves toward the inner side or the outer side of the disc and away from the proper position, the error signal TE shifts to a negative or positive polarity level. The signal processing circuit 6 generates the off track signal OT from a low frequency component of the EFM signal. The off track signal OT is maintained at a low level when the EFM signal is output properly (i.e., when the pickup 3 correctly reads data from the recording track of the disc 1). When the pickup 3 moves away from the proper position and the EFM signal is thus not properly output, the EFM signal goes high.

The servo control circuit 7 receives the EFM signal, the tracking error signal TE, and the off track signal OT from the signal processing circuit 6 and generates a spindle motor drive signal SD and an actuator drive signal TD. The spindle motor drive signal SD is generated to keep the cycle of the EFM signal constant when, for example, performing constant linear velocity (CLV) control to drive the disc 1 at a constant linear velocity. Further, the spindle motor drive signal SD is generated in accordance with a reference clock signal having a constant frequency when performing constant angular velocity (CAV) control to drive the disc 1 at a constant angular velocity. The servo control circuit 7 generates the actuator drive signal TD based on the tracking error signal TE and the off track signal OT. For example, to read data from the disc 1, the actuator drive signal TD is generated so that the tracking error signal TE becomes close to the "0" level. Such servo control rotates the disc 1 at a predetermined velocity (constant linear velocity or constant angular velocity) while the pickup 3 traces the recording track on the disc 1 to appropriately read the data recorded on the disc 1.

The actuator 5 causes the pickup 3 and the sled 4 to take a short jump or a long jump. A short jump moves the pickup 3 within a movable range on the sled 4. A long jump moves the sled 4 with the position of the pickup 3 in a fixed state.

In a short jump, only the pickup 3 is moved with the sled 4 in a fixed state. When the pickup 3 approaches the limit of the movable range on the sled 4, the sled 4 is moved slightly so that the pickup 3 may further be moved on the sled 4. The short jump is taken when reading data as the pickup 3 follows the recording track of the disc 1.

In a long jump, the moving distance of the pickup 3 relative to the disc 1 (normally, longer than the movable range of the pickup 3) is set, and the sled 4 moves in accordance with the set moving distance. In this state, the pickup 3, which is substantially fixed on the sled 4, reads signals from the disc 1 as the pickup 3 traverses the recording track on the disc 1. The reading operation of the pickup 3 is performed to count the number of recording tracks the pickup 3 skips and not to read the data recorded on the disc 1.

The polarity of the tracking error signal TE is inverted whenever the pickup 3 traverses the single recording track. Thus, the generated tracking error signal TE has a sine waveform when the pickup 3 consecutively traverses the recording track a number of times. Further, the generated EFM signal has a predetermined amplitude when the pickup 3 is above the recording track, and the generated EFM signal has a fixed value when the pickup 3 moves away from the recording track. Thus, the off track signal OT, which is generated from the low frequency component of the EFM signal alternately goes high and low as the pickup 3 traverses the recording track. The off track signal OT has the same cycle as the tracking error signal TE and has a phase that is either advanced or delayed by n/2 from the tracking error signal TE with respect to the moving direction of the pickup 3 (sled 4). The number of recording tracks the pickup 3 skips is detected by counting the tracking error signal TE or the off track signal OT. The movement of the sled 4 is stopped when the pickup skips the number of recording tracks that correspond to a target distance.

When moving the sled 4 by a target distance in the radial direction of the disc 1, the drive signal TD is generated so that the sled 4 is accelerated when the movement starts and the sled 4 is decelerated just before the position where the sled 4 is to stop. For example, referring to FIG. 2, from time t0, when the movement of the sled 4 starts, to time t1, when the sled 4 reaches a predetermined speed, the sled 4 is moved at a constant acceleration rate. Then, from time t1 to time t2, the sled 4 is moved at a constant velocity. After time t2, the sled 4 is moved at a negative acceleration rate so that the sled 4 stops at time t3. Time t2 is determined from the moving distance of the sled 4 and the acceleration rate during deceleration. When the moving distance of the sled 4 is relatively short or when the absolute value of the acceleration rate during deceleration is relatively small, time t2 is set so that it is earlier than time t1. In this case, constant velocity movement is not performed, and acceleration is switched to deceleration at time t2.

When moving the sled 4 with the drive signal TD, servo control is performed while confirming the moved distance of the sled 4 on the bases of the count value of the number of recording tracks the pickup 3 (sled 4) skips. Therefore, the sled 4 may stop after exceeding the target moving distance due to factors such as circuit delays or mechanical delays of a moving mechanism. Further, servo control, which is performed by confirming the actual moved distance of the sled 4, hinders high-speed movement of the sled 4.

To solve the above problem, a stepping motor enabling accurate rotation control may be employed in lieu of the spindle motor 2 to perform servo control. When using such a stepping motor, the moved distance of the sled 4 may easily be confirmed, and the sled 4 may be stopped accurately. However, to drive the stepping motor, a complicated drive pulse signal must be generated. Further, when repeating smooth acceleration and deceleration, the load applied to a drive circuit increases.

SUMMARY OF THE INVENTION

A perspective of the present invention is a method for controlling a stepping motor that moves an object from an initial position by a target distance. The method includes the steps of calculating a moved distance of the object from the difference between an initial position and present position of the object, calculating a remaining distance from a difference between the target distance and the moved distance, updating a first velocity value by adding a first acceleration value, which increases in a stepped manner in accordance with the moved distance, to the first velocity value until the moved distance exceeds a first reference value, updating a first position value, which indicates the present position of the object that is accelerated, by adding the updated first velocity value to the first position value, updating a second velocity value when the remaining distance is less than a second reference value by subtracting a second acceleration value, which decreases in a stepped manner in accordance with the remaining distance, from the secured velocity value, and updating a second position value, which indicates the present position of the object that is decelerated, by adding the updated second velocity value to the second position value.

A further perspective of the present invention is a method for controlling a stepping motor that moves an object from an initial position to a target position. The method the steps of includes calculating a moved distance of the object from the difference between an initial position and present position of the object, calculating a remaining distance from a difference between a target distance and the moved distance, comparing the remaining distance with a reference value, updating a first velocity value by adding a first acceleration value to the first velocity value when the remaining distance is less than the reference value, updating a first position value, which indicates the present position of the object that is accelerated, by adding the updated first velocity value to the first position value, repeating the step for calculating the moved distance, the step for calculating the remaining distance, the step for comparing the remaining distance with the reference value, the step for updating the first velocity value, and the step for updating the first position value until the remaining distance exceeds the reference value, updating a second velocity value when the remaining distance exceeds the reference value by subtracting a second acceleration value from the second velocity value, updating a second position value, which indicates the present position of the object that is decelerated, by adding the updated second velocity value to the second position value, and repeating the step for calculating the moved distance, the step for calculating the remaining distance, the step for comparing the remaining distance with the reference value, the step for updating the second velocity value, and the step for updating the second position value until the remaining distance becomes zero.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
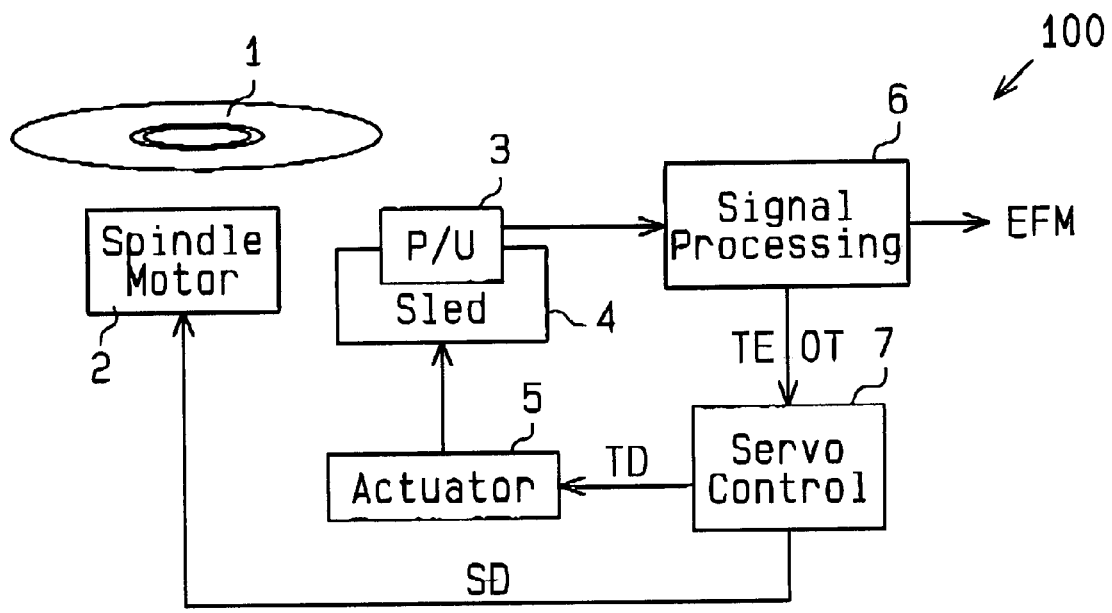
FIG. 1 is a schematic block diagram of a prior art disc reproduction apparatus.
Figure 2:
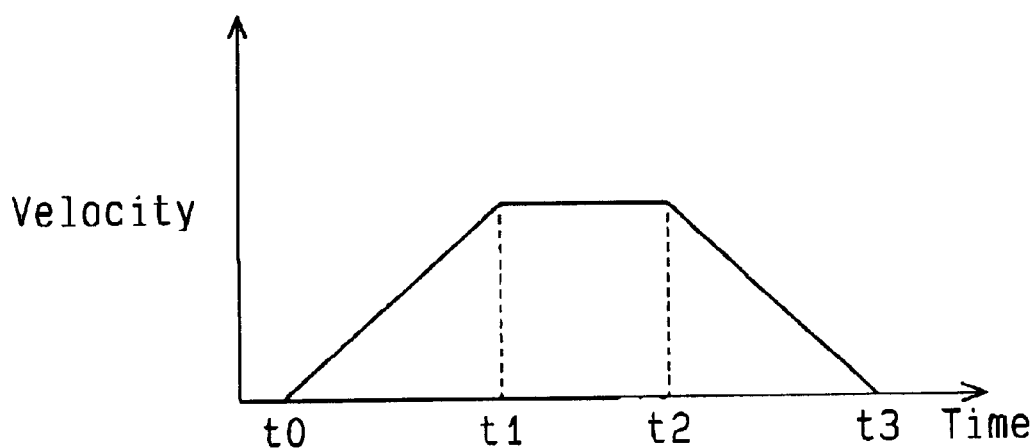
FIG. 2 is a graph showing the relationship between the moving velocity and moving time of the pickup during a long jump.

In the drawings, like numerals are used for like elements throughout.

Figure 3:
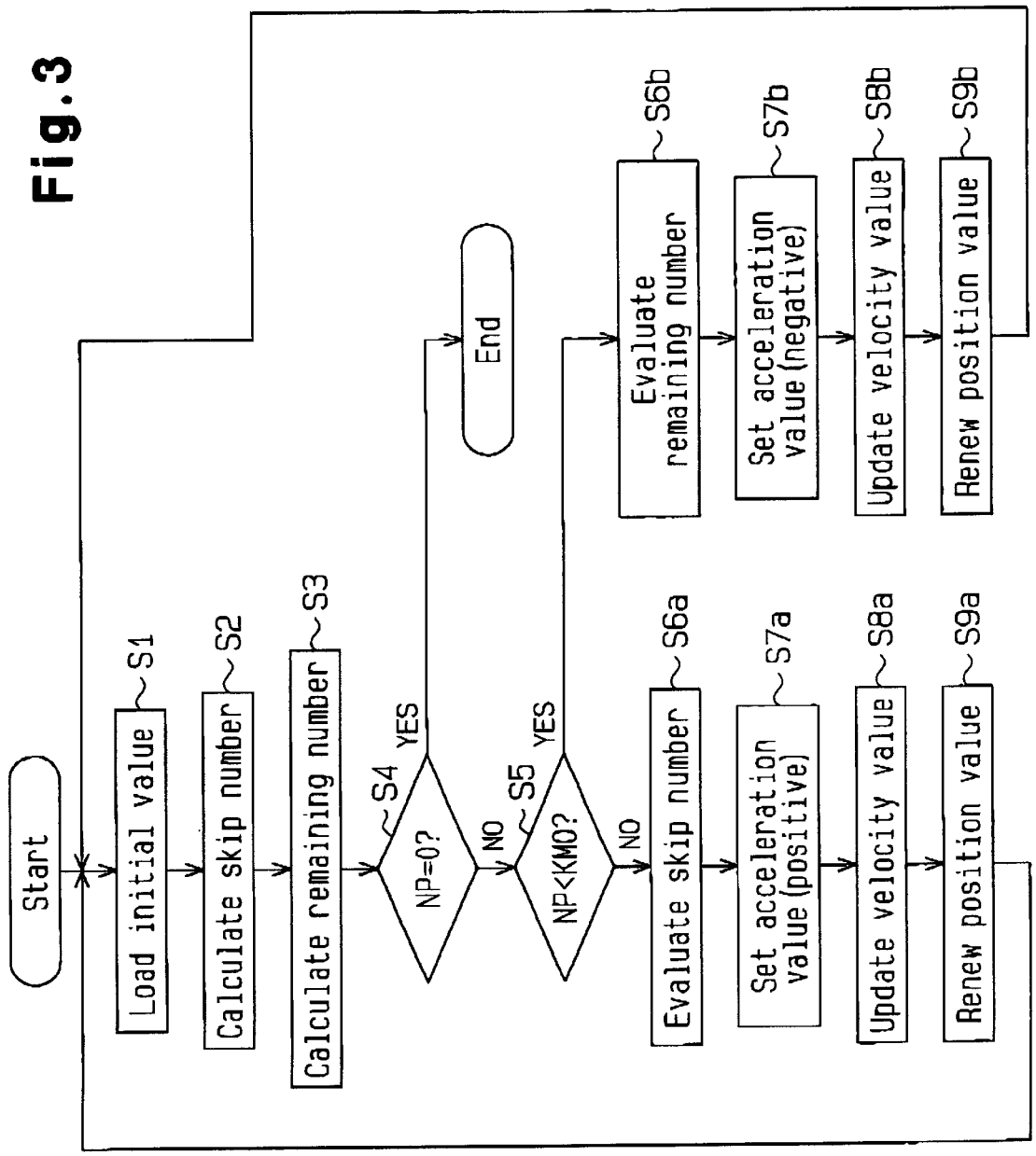
FIG. 3 is a flowchart illustrating a method for controlling a stepping motor according to a first embodiment of the present invention.
Figure 4:
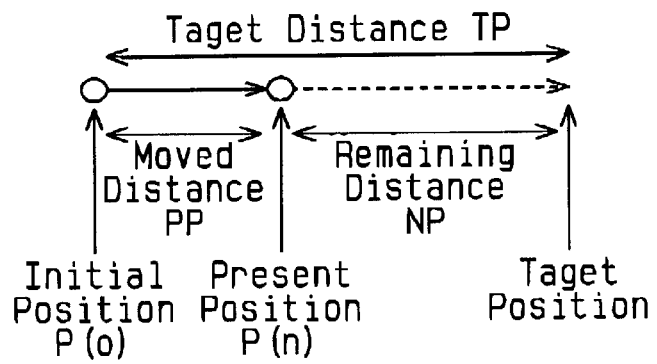
FIG. 4 is a diagram illustrating the relationship between data and an object moved by the stepping motor.
Figure 5A:
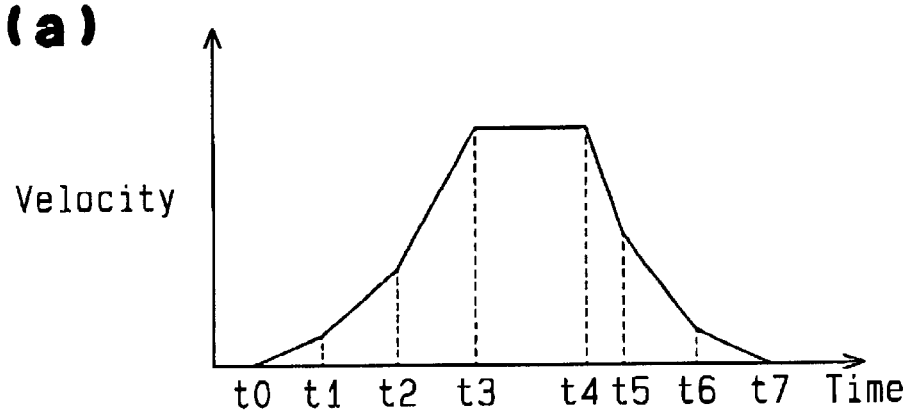
FIGS. 5(a) and 5(b) are graphs showing the relationship between the moving velocity and moving time of the object.
Figure 5B:
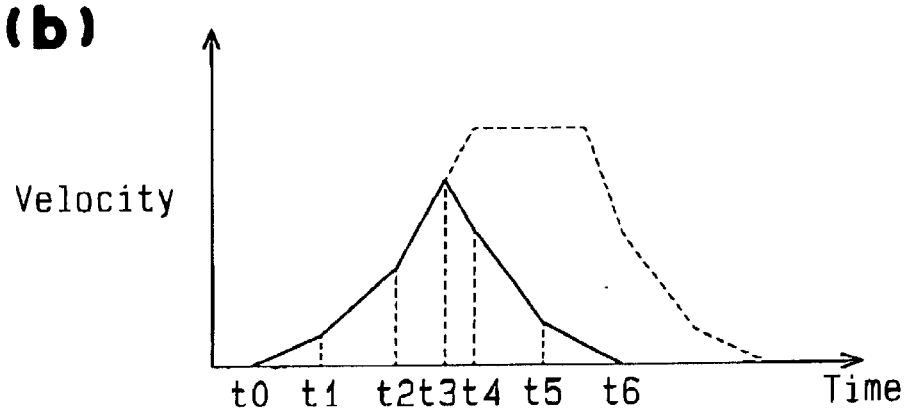

FIG. 3 is a flowchart illustrating a method for controlling a stepping motor according to a first embodiment of the present invention. The control method uses a stepping motor and not a spindle motor. Referring to FIG. 4, the flowchart of FIG. 3 illustrates the control method when moving an object (sled) from an initial position to a target position, which is separated from the initial position by a target distance. As shown in FIGS. 5(a) and 5(b), the moving velocity of the object is controlled so that the velocity increases in a stepped manner from when the movement starts and, subsequently, the acceleration rate decreases in a stepped manner to decrease the velocity.

In step S1, position value data P(0), which indicates the initial position of the object, and target value data TP, which indicates the target moving distance of the object, are loaded. These two pieces of data are held until processing is completed. In addition to these initial values, a plurality of acceleration values and a plurality of reference values, which are used to determine the timing for shifting the acceleration rate, are prepared.

In step S2, the position value data P(0), which indicates the initial position, is subtracted from position value data P(n), which indicates the present position of the object, to calculate skip number data PP, which indicates the distance the object moved. The initial position and the present position of the object are the same before the object starts moving. Thus, the moved distance is "0", that is, the skip number data PP is "0". When the following steps, which will be discussed below, and step S2 are repeated, the value of the skip number data PP increases in proportion to the distance the object moved from the initial position.

In step S3, the skip number data PP is subtracted from the target value data TP, which indicates the target moving distance of the object, to calculate remaining number data NP, which indicates the remaining distance from the present position of the object to the target position. Before the object starts moving, the skip number data PP is "0", and the remaining number data NP and the target value data TP coincide with each other. As step S2, step S3, and steps that will be described later are repeated, the value of the skip number data PP increases and the value of the remaining number data NP decreases.

In step S4, it is determined whether the remaining number data NP is "0". If the remaining number data NP is not "0", step S5 is performed, and if the remaining number data NF is "0", the process is terminated. Step S2, step S3, and steps that will be described later are repeated until the remaining data NP becomes "0", that is, until the object reaches the target position.

In step S5, it is determined whether the remaining number data NP has reached a reference value KM0, which is set in accordance with the target distance (value of the target value data TP). If the remaining number data NP has not reached the reference value KM0, acceleration steps S6a–S9a are performed, and if the remaining number data NP has reached the reference value KM0, deceleration steps S6b–S9b are performed.

In acceleration step S6a, the value of the skip number data PP is evaluated. In the following acceleration step S7a, a positive acceleration value is set in accordance with the evaluation of acceleration step S6a. For example, referring to FIG. 5(a), when accelerating the object in three steps at time t1, time t2, and time t3, reference values KM1, KM2, and KM3 are set in accordance with the moved distance of the object between time t0 and time t1, between time t0 and time t2, and between time t0 and time t3, respectively. In acceleration step S6a, the value of the skip number data PP is compared with each of the reference values KM1–KM3 and evaluated. When the value of the skip number data PP is less than or equal to the reference value KM1, minimum acceleration value data A(1) is set. When the value of the skip number data PP is between the reference value KM1 and the reference value KM2, second largest (intermediate) acceleration value data A(2) is set. When the value of the skip number data PP is between the reference value KM2 and the reference value KM3, maximum acceleration value data A(3) is set. When the value of the skip number data PP has reached the reference value KM3, acceleration value data A(0) having a value of "0" is set.

In acceleration step S8a, the acceleration value data A(m), which is set in acceleration step S7a, is added to a velocity value data V(n) to update the velocity value data V(n). The acceleration value data A(m) is added to the velocity value V(n) whenever the processing is repeated. Thus, the acceleration rate takes a value that is in accordance with the value of the acceleration value data A(m).

In acceleration step S9a, the velocity value data V(n) updated in acceleration step S8a is added to the position value data P(n) to update the position value data P(n). The position value data P(n) indicates the present position of the object. The velocity value data V(n) is added to the position value data P(n) to update the position value data P(n) and move the object in accordance with the value of the velocity value data V(n). After the acceleration step S9a is completed, the process returns to step S2 and the above processing is repeated.

As shown in FIG. 5(a), in acceleration steps S6a to S9a, the object moves as the acceleration rate increases in a step-like manner at times t1, t2, and t3. After time t3, the object moves at a constant velocity.

In deceleration step S6b, the value of the remaining number data NP generated in step S3 is evaluated. In the following acceleration step S7b, the acceleration value is set in accordance with the evaluation of acceleration step S6b. For example, referring to FIG. 5(a), when decelerating the object, which is moving at a constant velocity, in three steps at time t4, time t5, and time t6, reference values KM4, KM5, and KM6 are set in accordance with the moved distance of the object between time t4 and time t7, between time t5 and time t7, and between time t6 and time t7, respectively. In acceleration step S6b, the value of the remaining number data PP is compared with each of the reference values KM4–KM6 to evaluate the remaining number data NP. When the value of the remaining number data NP is between the reference value KM4 and the reference value KM5, maximum acceleration value data A(4) is set. When the value of the remaining number data NP is between the reference value KM5 and the reference value KM6, second largest (intermediate) acceleration value A(5) is set. When the value of the remaining number data NP is less than or equal to the reference value KM6, minimum acceleration value data A(6) is set.

In acceleration step S8b, the acceleration value data A(m), which is set in deceleration step S7b, is subtracted from the velocity value data V(n) to update the velocity value data V(n). The acceleration value data A(m) is subtracted from the velocity value V(n) whenever the processing is repeated. Thus, the acceleration rate takes a negative value in accordance with the value of the acceleration value data A(m). In deceleration step S9b, the velocity value data V(n) updated in deceleration step S8b is added to the position value data P(n) to update the position value data P(n). The updated position value data P(n) indicates that the object is being moved by the value of the velocity value data V(n). After the deceleration step S9b is completed, the process returns to step S2 and the above processing is repeated.

In deceleration steps S6b to S9b, the object moves as the absolute value of the acceleration rate decreases in a step-like manner between times t4 to t7 arid finally stops at time t7, as shown in FIG. 5(a).

Figure 7:
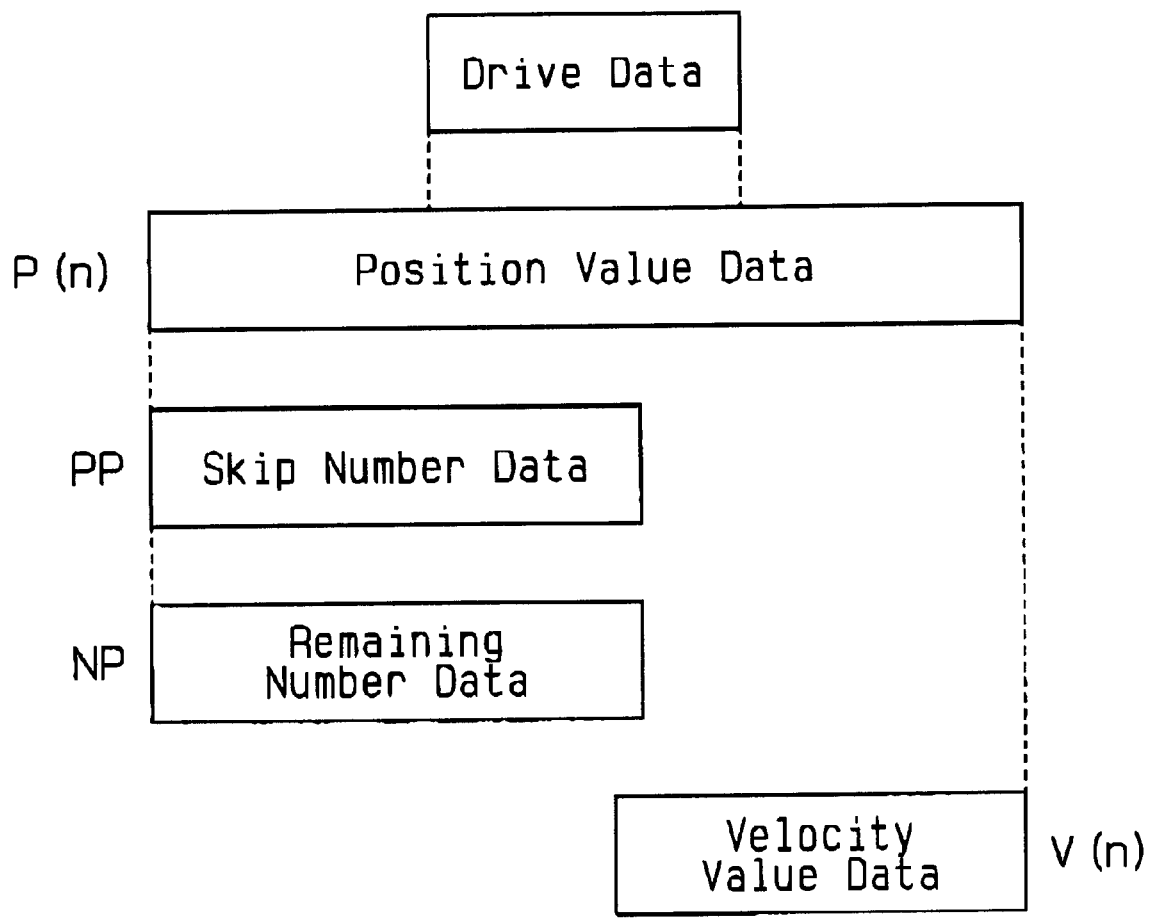
FIG. 7 is a diagram illustrating various data used by the control circuit of FIG. 6.

Each value of the position value data P(n) has a one to one relationship with a certain position in the movable range of the object. However, since a motor shaft of a stepping motor returns to its original position when rotated once, the position value data P(n) and the rotational position of tile shaft in the stepping motor do not have a one to one relationship. Accordingly, the position value data P(n) is configured by upper bits, intermediate bits, which represent the drive data of the stepping motor, and lower bits. For example, referring to FIG. 7, an appropriate number of intermediate bits are extracted as the drive data from the position value data P(n). The stepping motor is driven in accordance with the drive data. The upper bits of the position value data P(n) indicate the revolution speed of the stepping motor when moving the object. The lower bits of the position value data P(n) are remainder bits obtained through the calculation operation. The remainder bits are not directly related with the driving of the stepping motor but are used to decrease calculation errors and smoothen acceleration or deceleration of the stepping motor. The most significant bits of the skip and remaining number data PP and NP are matched with the most significant bit of the position value data P(n) Further, the least significant bit of the velocity value data V(n) is matched with the least significant bit of the position value data P(n).

In the example of FIG. 5(b), the target moving distance of the object is relatively short unlike the example of FIG. 5(a). Thus, the object must be decelerated before shifting to constant velocity movement. Such case also occurs when the set acceleration rate is relatively low causing acceleration and deceleration to be slow. To stop an object that is moving at a predetermined speed, a stopping distance that corresponds to the speed when deceleration is started must be provided. To guarantee that the stopping distance is provided, due to the target distance, the objects starts deceleration at time t3 even though the object is being accelerated. The shifting from acceleration to deceleration is performed in accordance with the determination of step S5. The reference value KM0 is set in accordance with the total moved distance of the object and the set value of the acceleration value data A(m). As shown in FIG. 5(a), when the moving distance of the object is long enough to enable acceleration of the object until the object moves at the constant velocity, the reference value KM0 is set to coincide with the reference value KM4, which is associated with the remaining number data NP at time t4.

Figure 6:
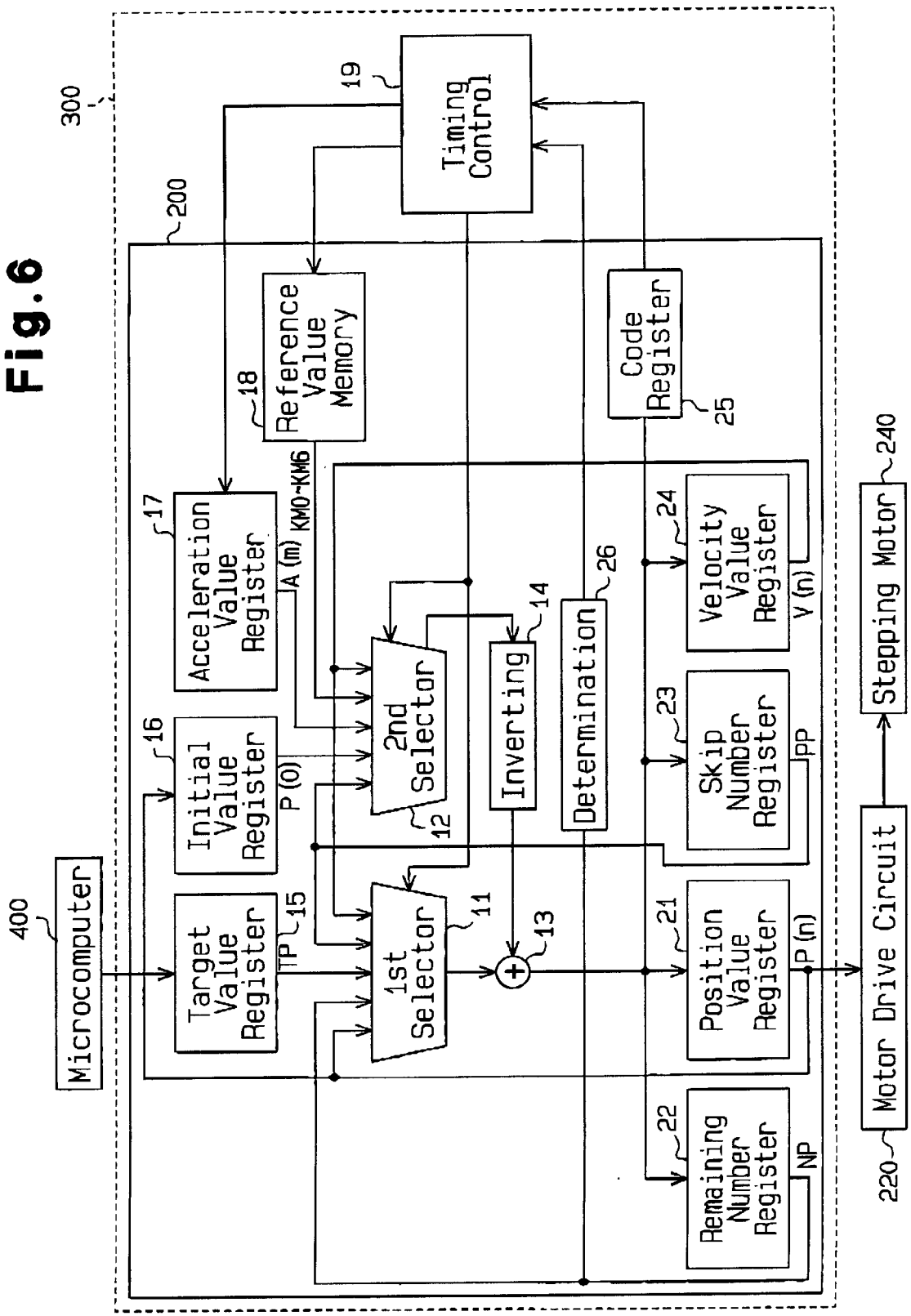
FIG. 6 is a schematic block diagram of a control circuit embodying the control method illustrated in the flowchart of FIG. 3.

FIG. 6 is a schematic block diagram of an operation circuit 200 embodying the method for controlling a stepping motor according to the present invention. The operation circuit 200 is incorporated in a servo control circuit 300 of a disc reproduction apparatus. The operation circuit 200 is connected to a motor drive circuit 220, which drives a stepping motor 240, and a timing control circuit 19. The operation circuit 200 sequentially updates the position value data P(n) in accordance with the flowchart of FIG. 3 and provides the intermediate bits of the updated position value data P(n) to the motor drive circuit 220.

The operation circuit 200 includes selectors 11, 12, an adder 13, a data inverting circuit 14, eight registers 15–17, 21–25, and a reference value memory 18. The timing control circuit 19 controls the operation timings of the selectors 11, 12, the data inverting circuit 14, each of the registers 17 and 21–24, and the reference value memory 18.

The first selector 11 receives the position value data P(n), the remaining number data NP, the target value data TP, the skip number data PP, and the velocity value data V(n) and selects one of these data in response to an instruction from the timing control circuit 19 and provides the selected data to the adder 13.

The second selector 12 receives the position value data P(n) as an initial value, the skip number data PP, the acceleration value data A(m), the velocity value data V(n), and the reference values KM0–KM6 and selects one of these data in response to an instruction from the timing control circuit 19 and provides the selected data to the adder 13 via the inverting circuit 14.

The adder 13 adds the data provided from the first selector 11 and the data provided from the second selector 12 via the inverting circuit 14. The adder 13 then provides data indicating the sum to the position value register 21, the remaining number register 22, the skip number register 23, or the velocity value register 24. Further, the adder 13 provides the code register 25 with a code bit, which indicates whether the sum is a positive or negative value. The inverting circuit 14 inverts each bit of the data provided from the second selector 12. The inverting enables the adder 13 to perform subtraction. In other words, by inverting the code of each data represented by the complement of 2, only the positive/negative code may be inverted without changing the absolute value of the data. Thus, a subtraction operation is performed by providing the adder 13 with inverted data. When performing an adding operation with the adder 13, the inverting circuit 14 does not invert and passes the data provided from the second selector 12.

The target value register 15 stores the target value data TP, which indicates the target moving distance of the object, and provides the target value data TP to the first selector 11. The target value data TP is set by a microcomputer 400, which instructs the movement of the object. In an initial state, the initial value register 16 retrieves the position value data P(0), which is stored in the position value register 21, as an initial value, and provides the second selector 12 with the position value data P(0). The target value register 15 stores a single piece of data and constantly provides the first selector 11 with the same data. The initial value register 16 stores a single piece of data and constantly provides the second selector 12 with the same data.

The acceleration value register 17 stores the acceleration value data A(m), which is set in accordance with the value of the remaining number data NP or the skip number data PP. Further, the acceleration value register 17 provides the set acceleration value data A(m) to the second selector 12 in response to an instruction from the timing control circuit 19. The reference value memory 18 holds the reference values KM0–KM6, which are used to determine the timing for shifting the acceleration rate. Further, the reference value memory 18 sequentially provides the reference values KM0–KM6 to the second selector 12 in response to an instruction from the timing control circuit 19.

The timing control circuit 19 controls the selection operation of the selectors 11, 12 and, in synchronism with the selection operation, the retrieving timing of the registers 22–25. Simultaneously, the timing control circuit selects the inverting or non-inverting of data with the inverting circuit 14. Further, the timing control circuit 19 synchronizes the reading of the reference values KM0–KM6 from the reference value memory 18 with the selection of the selectors 11, 12 and the retrieving timing of the registers 22–25.

The position value register 21, which is connected to the adder 13, retrieves from the adder 13 the sum of the position value data P(n), which is selected by the first selector 11, and the velocity value data V(n), which is selected by the second selector 12, as an updated position value data P(n+1). In this state, the inverting circuit 14 provides the adder 13 with the velocity value data V(n) without processing the velocity value data V(n) The intermediate bits of the position value data P(n) stored in the position value register 21 are provided to the motor drive circuit 220 as the drive data. In other words, referring to FIG. 7, the intermediate bits that remain after excluding the upper bits, which indicate the stepping motor revolution speed, and the lower bits, which are the remainder of a calculation, are provided as the drive data of the stepping motor 240.

The remaining number register 22, which is connected to the adder 13, retrieves the upper bits of the sum of the target value data TP, which is selected by the first selector 11, and the remaining number data PP, which is selected by the second selector 12, from the adder 13 as the remaining number data NP. In this state, the inverting circuit 14 provides the adder 13 with the inverted skip number data PP.

The skip number register 23, which is connected to the adder 13, retrieves the upper bits of the sum of the position value data P(n), which is selected by the first selector 11, and the position value data P(0), which serves as an initial value and is selected by the second selector 12, from the adder 13 as the skip number data PP. In this state, the inverting circuit 14 provides the adder 13 with the inverted position value data P(0).

The velocity value register 24, which is connected to the adder 13, retrieves the velocity value data V(n), which is selected by the first selector 11, and the acceleration value data A(m), which is selected by the second selector 12, from the adder 13 as a new velocity value V(n+1). In this state, the inverting circuit 14 provides the acceleration value data A(m) to the adder 13 without processing the acceleration value data A(m). The timing for retrieving the data of each of the registers 21–24 is synchronized with the selection operation of each selector 11, 12 by an instruction from the timing control circuit 19.

The code register 25, which is connected to the adder 13, retrieves only the code bit of the sum of the remaining number data NP, which is selected by the first selector 11, and the reference value KM0, which is selected by the second selector 12, from the adder 13. Further, the code register 25 retrieves the code bit of the sum of the remaining number data NP or the skip number data PP, which is selected by the first selector 11, and one of tho reference values KM1–KM6, which is selected by the second selector 12, from the adder 13. When these adding operations are performed, the inverting circuit 14 provides the inverted reference value to the adder 13. In other words, to determine whether the remaining number data NP or the skip number data PP is greater than or less than each of the reference values KM0–KM6, each reference value KM0–KM6 is subtracted from (the inverted reference value is added to) the remaining number data NP or the skip number data PP, and only the code of the result is retrieved.

The determination circuit 26, which is connected to the remaining number register 22, determines whether the value of the remaining number data NP is "0" and provides the determination result to the timing control circuit 19. The determination circuit 26 includes, for example, a NAND gate for receiving every bit of the remaining number data NP. The NAND gate outputs determination data "1" when every bit of the remaining data NP is "0".

The operation of the operation circuit 200 will now be discussed.

First, the position value data P(0) corresponding to the initial position of the object is stored in the position value register 21, and the target value data TP, which indicates the target moving distance, is stored in the target value register 15. When continuously controlling the movement of the object, the position value data P(n), which is stored in the position value register 21 when a single movement control is completed, is used as an initial value when the next movement control is started. The target value data TP is set in the target value register 15 by the microcomputer 400, which instructs the movement of the object.

In step S1, the position value data P(0) is loaded to the initial value register 16 from the position value register 21 as an initial value. In step S2, the first selector 11 selects the position value data P(n) from the position value register 21, and the second selector 12 selects the position value data P(0) from the initial value register 16. In this state, the inverting circuit 14 inverts the position value data P(0) In this manner, the calculation of "P(n)–P(0)" is performed, and the calculation result is stored in the skip number register 23 as the skip number data PP. In this state, for example, referring to FIG. 7, only the upper bits of the calculation result are stored in the skip number register 23 as the skip number data PP.

In step S3, the first selector 11 selects the target value data TP from the target value register 15, and the second selector 12 selects the skip number data PP from the skip number register 23. In this state, the inverting circuit 14 inverts the skip number data PP. In this manner, the calculation of "TP–PP" is performed, and the calculation result is stored in the remaining number register 22 as the remaining number data NP. In this state, only the upper bits of the calculation result are stored in the remaining number register 22 as the remaining number data NP.

In step S4, the determination circuit 26 receives the remaining number data NP from the remaining number register 22 and determines whether the remaining number data NP is "0". The determination is sent to the timing control circuit 19. If the remaining number data NP is not "0", the timing control circuit 19 instructs to proceed to step S5. If the remaining number data NP is "0", the timing control circuit stops the operation of each circuit and terminates the processing.

In step S5, the reference value KM0 is read from the reference value memory 18, the first selector 11 selects the remaining number data NP from the remaining number register 22, and the second selector 12 selects the reference value KM0 from the reference value memory 18. In this state, the inverting circuit 14 inverts the reference data KM0. In this manner, the calculation of "NP–KM0" is performed, and the code bit of the calculation result is provided to the timing control circuit 19 via the code register 25 from the adder 13. If the code bit is positive, the value of the remaining data NP is greater than the reference value KM0. Thus, the timing control circuit 19 instructs each circuit to proceed to acceleration step S6a. If the code bit is negative, the value of the remaining number data NP is less than the reference value KM0. Thus, the timing control circuit 19 instructs each circuit to proceed to deceleration step S6b.

In acceleration step S6a, the reference values KM1–KM3 used to determine the shifting of the acceleration value is sequentially read from the reference value memory 18, the first selector 11 selects the skip number data PP from the skip number register 23, and the second selector 12 selects the reference value KM1, KM2, or KM3 from the reference value memory 18. In this state, the inverting circuit 14 inverts the reference value KM1, KM2, or KM3. In this manner, calculations "PP–KM1," "PP–KM2," and "PP–KM3" are sequentially performed in synchronism with tho reading of the reference value memory 18, and the code bit of each calculation result is provided to the timing control circuit 19.

In acceleration step S7a, the timing control circuit 19 determines the acceleration value based on the code bit of acceleration step S6a, and the determined acceleration value data A(m) is stored in the acceleration value register 17. The minimum acceleration value data A(1) is set until the value of the skip number data PP, which corresponds with the moved distance of the object, reaches the first reference value KM1. In other words, the minimum acceleration value is set when the acceleration of the object starts. The acceleration value is then increased in a stepped manner. As the value of the skip number data PP increases, the timing control circuit 19 sequentially stores the acceleration value data A(2) and A(3) [A(1)<A(2)<A(3)] in the acceleration value register 17 when the skip number data PP reaches the second reference value KM2 and the third reference value KM3.

In acceleration step S8a, the first selector 11 selects the velocity value data V(n) from the velocity value register 24, and the second selector 12 selects the acceleration value data A(m) from the acceleration value register 17. In this state, the inverting circuit 14 does not invert the acceleration value data A(m). In this manner, calculation "V(n)+A(m)" is performed, and the calculation result is stored in the velocity value register 24 as the updated velocity value data V(n+1).

In acceleration step S9a, the first selector 11 selects the position value data P(n) from the position value register 21, and the second selector 12 selects the velocity value data V(n) from the acceleration value register 17. In this state, the inverting circuit 14 does not invert the velocity value data V(n). In this manner, calculation "P(n)+V(n)" is performed, and the calculation result is stored in the position value register 21 as the position value data P(n+1).

In deceleration step S6b, the reference values KM4–KM6 used to determine the shifting of the deceleration value is sequentially read from the reference value memory 18, the first selector 11 selects the remaining number data NP from the remaining number register 22, and the second selector 12 selects the reference value KM4, KM5, or KM6 from the reference value memory 18. In this state, the inverting circuit 14 inverts the reference value KM4, KM5, or KM6. In this manner, calculations "PP–KM4," "PP–KM5," and "PP–KM6" are sequentially performed in synchronism with the reading of the reference value memory 18, and the code bit of each calculation result is provided to the timing control circuit 19.

In deceleration step S7b, the timing control circuit 19 determines the acceleration value bused on the code bit of deceleration stop S6b, and the determined acceleration value data A(m) is stored in the acceleration value register 17 The maximum acceleration value data A(4) is set until the value of the remaining number data NP, which corresponds with the remaining distance to the stopping position of the object, reaches the fourth reference value KM4. This is to maximum deceleration when the deceleration of the object starts and to minimize deceleration just before the object stops. As the value of the remaining number data NP decreases, the timing control circuit 19 sequentially stores the acceleration value data A(5) and A(6) [A(6)<A(5)<A(4)] in the acceleration value register 17 as the remaining number data NP decreases and reaches the fifth reference value KM5 and the sixth reference value KM6.

In deceleration step S8b, the first selector 11 selects the velocity value data V(n) from the velocity value register 24, and the second selector 12 selects the acceleration value data A(m) from the acceleration value register 17. In this state, the inverting circuit 14 inverts the acceleration value data A(m) In this manner, calculation "V(n)–A(m)" is performed, and the calculation result is stored in the velocity value register 24 as the updated velocity value data V(n+1).

In deceleration step S9b, the first selector 11 selects the position value data P(n) from the position value register 21, and the second selector 12 selects the velocity value data V(n) from the acceleration value register 17. In this state, the inverting circuit 14 does not invert the velocity value data V(n) In this manner, calculation "P(n)+V(n)" is performed, and the calculation result is stored in the position value register 21 as the position value data P(n+1).

When acceleration steps S6a–S9a or deceleration steps S6b–S9b are completed, the updated position value data P(n+1) and the updated velocity value data V(n+1) are stored in the position value register 21 and the velocity value register 24, respectively. The position value data P(n) is updated by repeating steps S2–S5 and S6a–S9a. Further, the velocity value data V(n) is updated by repeating the operations of steps S2–S5 and S6b to 39b.

In the operation circuit 200, the single adder 13 is operated in a time-divisional manner to perform every operation. This decreases the circuit area. In the preferred embodiment, the number of selectors and adders may be increased, and a plurality of operations may be performed in parallel to one another. In such a case, the parallel operations enable an increase in speed. The number of adders is determined to obtain the circuit area and processing speed that is in accordance with the purpose of usage.

In the present invention, the velocity value data is added to the position value data, which indicates the position of the object, to drive the stepping motor 240. In this state, the acceleration value data is added to or subtracted from the velocity value data in a stepped manner. Thus, the operation circuit 200 does not have to perform a complicated operation, and the load on the drive circuit 220 is small. As a result, the stepping motor 240 accelerates and decelerates smoothly.

In the present invention, the stepping motor 240, which enables accurate rotation control, is employed to move the object (sled). This increases the response speed when the sled of a disc reproduction apparatus is servo-controlled. Further, the velocity value is updated while shifting the acceleration value in accordance with the moved distance of the object of the remaining distance to the target position. Thus, the speed for processing operations is increased.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A method for controlling a stepping motor that moves an object from an initial position by a target distance, the method comprising the steps of:

calculating a moved distance of the object from the difference between an initial position and present position of the object;

calculating d remaining distance from a difference between the target distance and the moved distance;

updating a first velocity value by adding a first acceleration value, which increases in a stepped manner in accordance with the moved distance, to the first velocity value until the moved distance exceeds a first reference value;

updating a first position value, which indicates the present position of the object that is accelerated, by adding the updated first velocity value to the first position value;

updating a second velocity value when the remaining distance is less than a second reference value by subtracting a second acceleration value, which decreases in a stepped manner in accordance with the remaining distance, from the second velocity value; and updating a second position value, which indicates the present position of the object that is decelerated, by adding the updated second velocity value to the second position value.

2. The method according to claim 1, wherein the step for updating the first velocity value is interrupted to proceed to the step for updating the second velocity value when the moved distance reaches a third reference value, which is set in accordance with the target distance, before the moved distance exceeds the first reference value.

3. The method according to claim 2, wherein the third reference value is set in accordance with the target distance, the first acceleration value, and the second acceleration value.

4. The method according to claim 2, wherein the third reference value is set in accordance with the relationship between the target distance and the distance required for stopping the object.

5. The method according to claim 1, wherein the initial second velocity value is equal to the final updated first velocity value.

6. A method for controlling a stopping motor that moves an object from an initial position to a target position, the method comprising the steps of:

calculating a moved distance of the object from the difference between an initial position and present position of the object;

calculating a remaining distance from a difference between a target distance and the moved distance;

comparing the remaining distance with a reference value;

updating a first velocity value by adding a first acceleration value to the first velocity value when the remaining distance is less than the reference value;

updating a first position value, which indicates the present position of the object that is accelerated, by adding the updated first velocity value to the first position value;

repeating the step for calculating the moved distance, the step for calculating the remaining distance, the step for comparing the remaining distance with the reference value, the step for updating the first velocity value, and the step for updating the first position value until the remaining distance exceeds the reference value;

updating a second velocity value when the remaining distance exceeds the reference value by subtracting a second acceleration value from the second velocity value;

updating a second position value, which indicates the present position of the object that is decelerated, by adding the updated second velocity value to the second position value; and repeating the step for calculating the moved distance, the step for calculating the remaining distance, the step for comparing the remaining distance with the reference value, the step for updating tho second velocity value, and the step for updating the second position value until the remaining distance becomes zero.

7. The method according to claim 6, further comprising the steps of:

increasing the first acceleration value in a stepped manner in accordance with the remaining distance; and decreasing the second acceleration value in a stepped manner in accordance with the remaining distance.

8. The method according to claim 7, wherein the first acceleration value is increased in multiple steps, and the second acceleration value is decreased in multiple steps.

9. The method according to claim 6, wherein the reference value is set in accordance with the target distance.

10. The method according to claim 6, wherein the reference value is set in accordance with the target distance, the first acceleration value, and the second acceleration value.

11. The method according to claim 6, wherein the reference value is sot in accordance with the relationship between the target distance and the distance required for stopping the object.

12. The method according to claim 6, wherein the initial second velocity value is equal to the final updated first velocity value.

* * * * *